US012570098B2

(12) United States Patent
Asai

(10) Patent No.: US 12,570,098 B2
(45) Date of Patent: Mar. 10, 2026

(54) PRINTING APPARATUS

(71) Applicant: CANON KABUSHIKI KAISHA, Tokyo (JP)

(72) Inventor: Yasuyuki Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/494,170

(22) Filed: Oct. 25, 2023

(65) Prior Publication Data

US 2024/0140114 A1 May 2, 2024

(30) Foreign Application Priority Data

Oct. 27, 2022 (JP) ................................. 2022-172189

(51) Int. Cl.

| | |
|---|---|
| ***B41J 15/04*** | (2006.01) |
| ***B41J 15/02*** | (2006.01) |
| ***B41J 29/02*** | (2006.01) |
| ***B41J 29/13*** | (2006.01) |

(52) U.S. Cl.

CPC ............. *B41J 15/042* (2013.01); *B41J 15/02* (2013.01); *B41J 15/046* (2013.01); *B41J 29/02* (2013.01); *B41J 29/13* (2013.01)

(58) Field of Classification Search

CPC ........ B41J 15/04; B41J 15/042; B41J 15/046; B41J 15/02; B41J 29/12; B41J 29/13; B41J 29/02

See application file for complete search history.

(56) References Cited

U.S. PATENT DOCUMENTS

2011/0211210 A1* 9/2011 Niihara .............. H04N 1/00588 358/1.12
2020/0236236 A1* 7/2020 Ohashi ............... H04N 1/00551

FOREIGN PATENT DOCUMENTS

JP 2010-215396 A 9/2010

* cited by examiner

*Primary Examiner* — Douglas X Rodriguez
*Assistant Examiner* — Kendrick X Liu
(74) *Attorney, Agent, or Firm* — Venable LLP

(57) ABSTRACT

A technique capable of inhibiting a decrease in work efficiency at the time of replacing a roll sheet is usable with a supply unit configured to support, in a rotatable manner, the roll sheet to which a shaft member is attached and supply a sheet unwound from the roll sheet; a base part arranged above the supply unit and configured to be capable of supporting the roll sheet; and a guide part configured to guide the roll sheet to which the shaft member is attached to the supply unit via the shaft member. The shaft member is inserted into the guide part by moving the roll sheet to which the shaft member is attached from the base part.

15 Claims, 10 Drawing Sheets

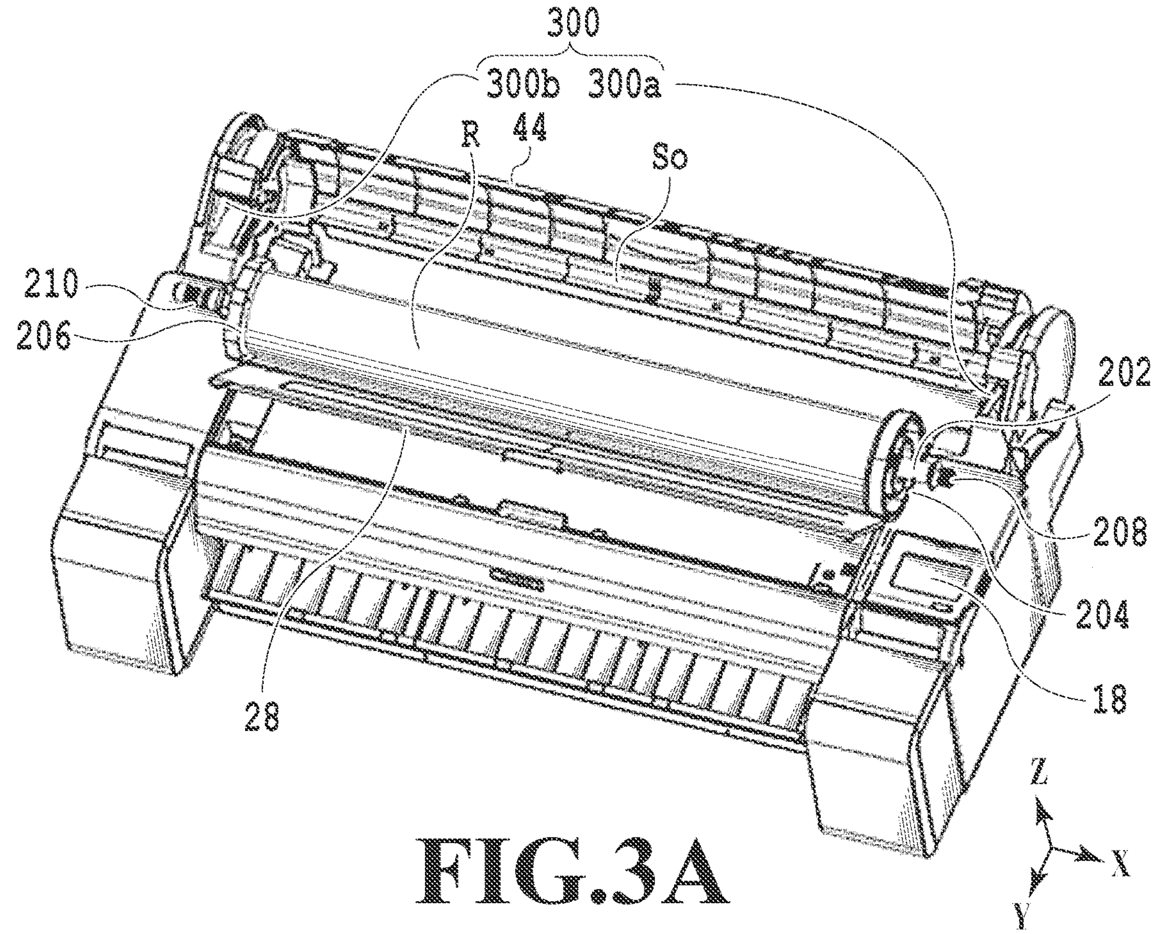
FIG.3A
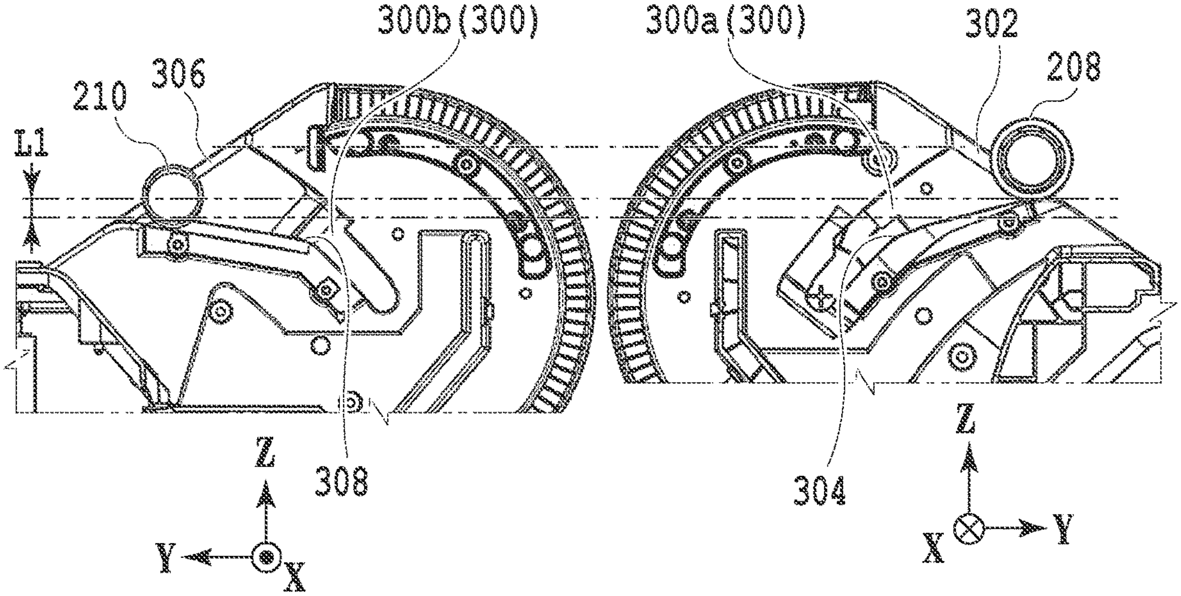
FIG.3B
FIG.3C

PRINTING APPARATUS

BACKGROUND OF THE INVENTION

Field of the Invention

The present invention relates to a printing apparatus that performs printing on a sheet pulled out from a roll sheet.

Description of the Related Art

Japanese Patent Laid-Open No. 2010-215396 discloses a technique in which a roll sheet to which a spool is attached is placed on a temporary placement base, which supports both ends of the spool, so as to perform positioning of the roll sheet as the roll sheet is moved from the temporary placement base to a support part, which supports the roll sheet so that the roll sheet can be drawn out.

However, with the technique disclosed in Japanese Patent Laid-Open No. 2010-215396, at the time of replacing a roll sheet, the spool has to be attached to the new roll sheet in a different space. For this reason, for example, if the space where the spool can be attached to the roll sheet is located away from the printing apparatus, work efficiency at the time of replacing the roll sheet is decreased.

SUMMARY OF THE INVENTION

The present invention has been made in view of the above-described problem, so as to provide a technique capable of inhibiting a decrease in work efficiency at the time of replacing a roll sheet.

In the first aspect of the present invention, there is provided a printing apparatus including:

- a shaft member attached to a roll sheet formed by winding a sheet;
- a supply unit configured to support, in a rotatable manner, the roll sheet to which the shaft member is attached and supply a sheet unwound from the roll sheet to which the shaft member is attached;
- a printing unit configured to perform printing on the sheet supplied by the supply unit;
- a base part arranged above the supply unit and configured to be capable of supporting the roll sheet; and
- a guide part configured to guide the roll sheet to which the shaft member is attached to the supply unit via the shaft member,
- wherein the shaft member is inserted into the guide part by moving the roll sheet to which the shaft member is attached from the base part.

According to the present invention, it is possible to inhibit a decrease in work efficiency at the time of replacing a roll sheet.

Further features of the present invention will become apparent from the following description of exemplary embodiments with reference to the attached drawings.

BRIEF DESCRIPTION OF THE DRAWINGS

FIG. 3A to FIG. 3C are diagrams for explaining a guide;

DESCRIPTION OF THE EMBODIMENTS

Hereinafter, with reference to the accompanying drawings, a detailed explanation is given of an example of embodiments of a printing apparatus. Note that the following embodiments are not intended to limit the present invention, and each combination of the characteristics explained in the present embodiments is not necessarily essential to the solution in the present invention. Further, the positions, shapes, etc., of the constituent elements described in the embodiments are merely examples and are not intended to limit the range of this invention to that of the examples.

(Configuration of a Printing Apparatus)

In the present embodiment, an explanation is given of a printing apparatus that performs printing by ejecting ink using an inkjet system as an example, but the technique according to the present embodiment can also be applied to a multifunction peripheral that is equipped with a copying function, a scanning function, etc., in addition to a printing function. As the inkjet system, various systems such as a system using a heating element, a system using a piezoelectric element, a system using an electrostatic element, a system using a MEMS element, etc., can be used. Moreover, the printing system is not limited to the inkjet systems, and various systems such as an electrophotographic system and a thermal transfer system can be used.

Figure 1:
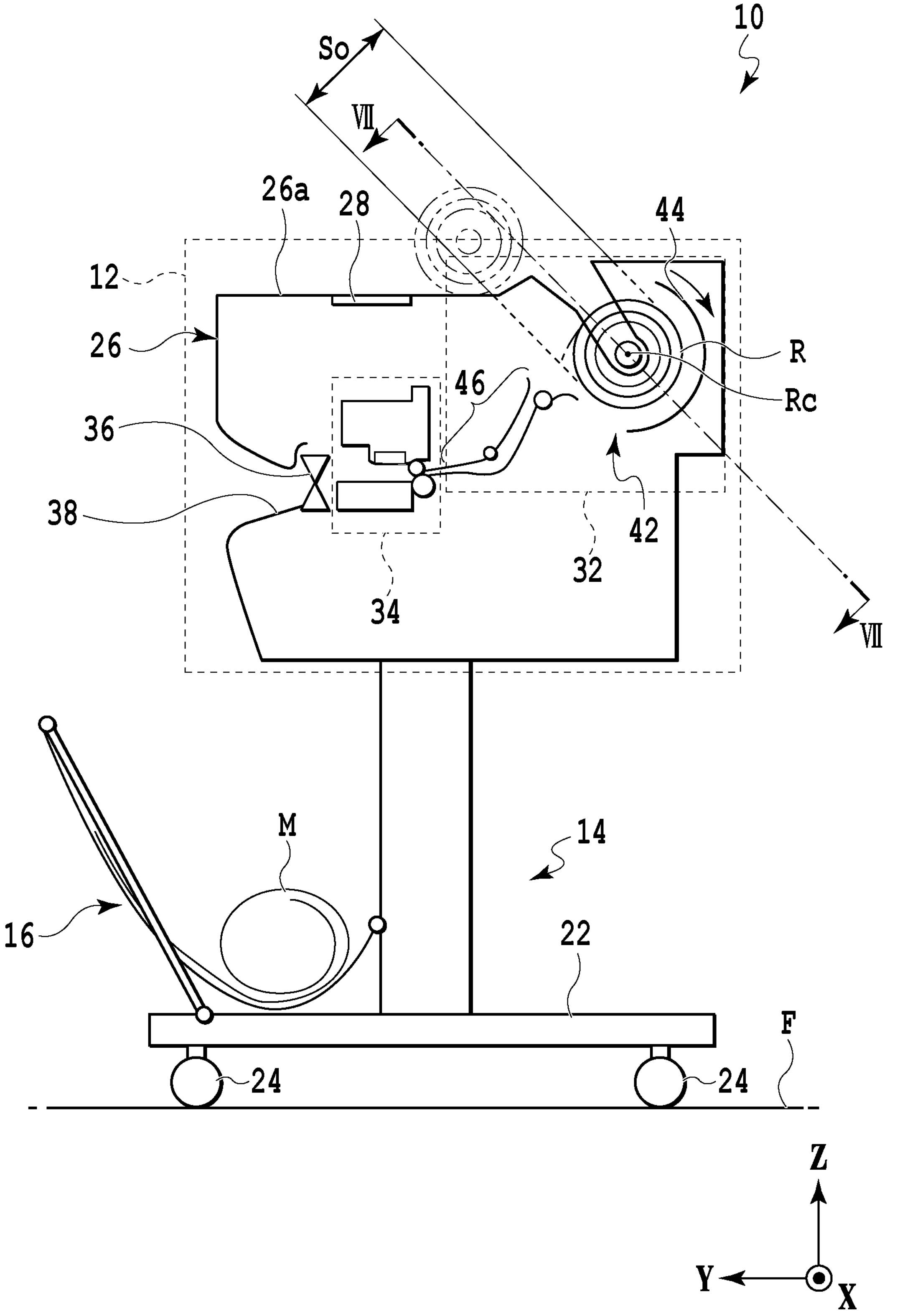
FIG. 1 is a schematic configuration diagram of a printing apparatus.

FIG. 1 is a schematic configuration diagram of a printing apparatus according to the present embodiment. Here, regarding the directions in this specification, the explanation is given on the premise that the direction where the user is directly facing the printing apparatus is indicated unless otherwise specified, and the left-right direction (the width direction) of the apparatus at the time directly facing the apparatus is the X direction, and the front-back direction that intersects the X direction is the Y direction (the depth direction). Further, the explanation is given on the premise that the up-down direction (the height direction) at the time directly facing the apparatus, which intersects with the X direction and the Y direction, is the Z direction.

The printing apparatus 10 is equipped with the main body part 12 which performs printing, the stand part 14 which supports the main body part 12 at a predetermined height position, the accommodation part 16 which accommodates the print medium M discharged from the main body part 12, and the operation part 18 (see FIG. 3A to FIG. 3C) which makes execution of user input operations possible. The stand part 14 supports the main body part 12 at a height position where the user can easily operate from the setting floor surface F. The stand part 14 is equipped with the legs 22 extending in the Y direction so as to face the setting floor surface F, and, near both ends of the legs 22 in the Y direction, the casters 24 are installed to facilitate easy movement over the setting floor surface F. The accommodation part 16 is formed so that an accommodation space capable of accommodating the print medium M is positioned on the front side of the printing apparatus 10 and partially overlaps with the main body part 12 in the Y direction. The length of the accommodation part 16 in the X direction corresponds to the maximum print medium M that can be discharged from the main body part 12.

The main body part 12 is equipped with the supply part 32, which supplies the sheet-form print medium M (hereinafter also referred to as a "sheet") pulled out from the therein-held roll sheet R to the printing part 34 (described hereinafter), and the printing part 34, which performs printing on the print medium M supplied by the supply part 32. Further, the main body part 12 is equipped with the cutter part 36, which cuts the print medium M after printing performed by the printing part 34, and the discharge part 38, which guides the discharged print medium M as the print medium M is discharged after printing. The supply part 32, the printing part 34, the cutter part 36, and the discharge part 38 are installed inside the housing 26 of the main body part 12, and a part of the discharge part 38 is configured to be exposed to the outside of the housing 26. Further, in the main body part 12, the supply part 32, the printing part 34, the cutter part 36, and the discharge part 38 are arranged in this order from the back side to the front side. Note that the housing 26 is equipped with the access cover 28 that is openable to allow the user access to the printing part 34. The access cover 28 is positioned near the upper side of the printing part 34.

<Supply Part>

The supply part 32 is equipped with the roll holder 42, which holds the roll sheet R in a rotatable manner, and the cover part 44, which exposes the internal space of the roll holder 42 to the outside or shields the internal space of the roll holder 42 from the outside. Further, the supply part 32 is equipped with the supply path 46, which supplies the sheet-form print medium M pulled out from the therein-held roll sheet R to the printing part 34. As the roll holder 42 is made to hold the roll sheet R, the cover part 44 is opened to expose the internal space of the roll holder 42 to the outside, and the roll sheet R is inserted into the exposed internal space.

=Roll Holder=

The roll holder 42 is positioned on the back side of the housing 26. Therefore, if the cover part 44 is opened, the opening area So which communicates with the internal space of the roll holder 42 is formed on the back side of the upper surface 26*a* of the housing 26. Here, on the upper surface 26*a*, where the access cover 28 is formed, at a position on the back side of the access cover 28 and on the front side of the opening area So, the temporary placement base 48, where the roll sheet R, which can be held by the roll holder 42, can be placed, is formed. The details of the temporary placement base 48 are described hereinafter.

Figure 2:
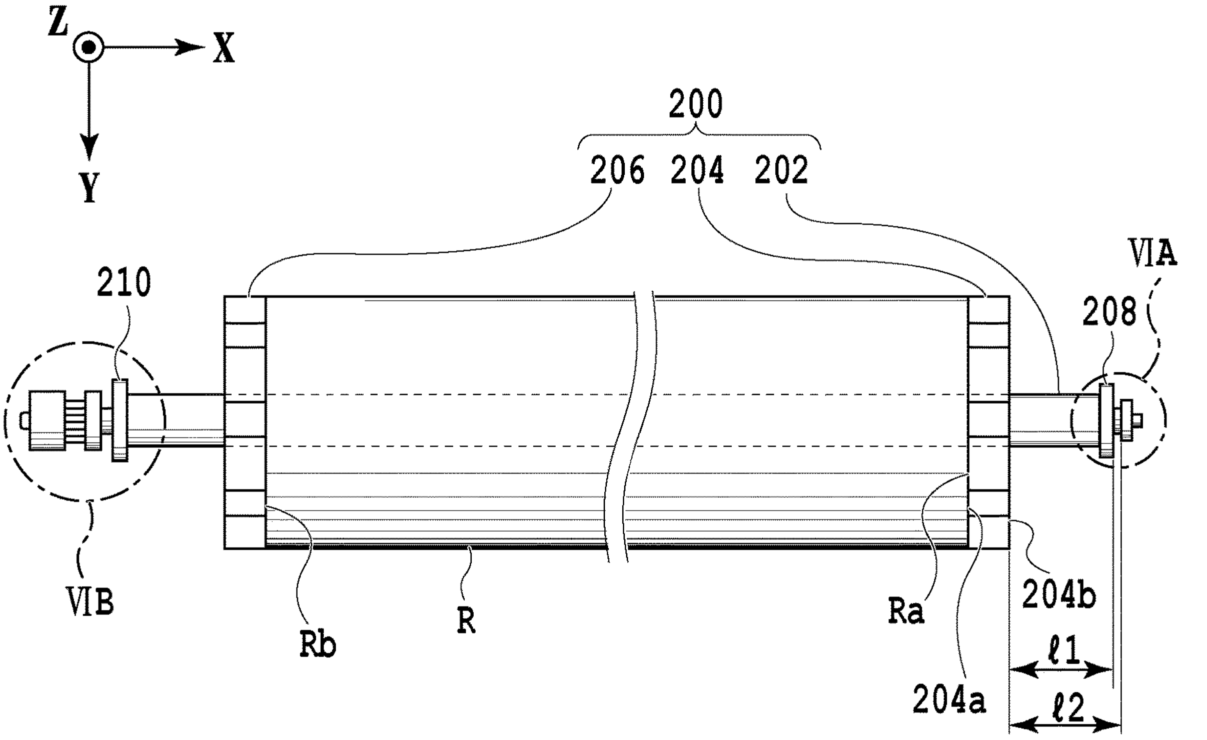
FIG. 2 is a diagram illustrating a spool member attached to a roll sheet.

Here, the roll sheet R is formed by winding the long sheet-form print medium M around a hollow cylindrical core. Further, the roll sheet R, in a condition where the spool member 200 is attached, is held in a rotatable manner at the set position RC (see FIG. 1) of the roll holder 42. FIG. 2 is a diagram illustrating the spool member 200 attached to the roll sheet R. The spool member 200 is equipped with the spool shaft 202 inserted through the core of the roll sheet R and integrally fixed to the roll sheet R. Further, the spool member 200 (the shaft member) is equipped with the flanges 204 and 206 that support the ends of the roll sheet R. The flange 204 is fixed abutting the end surface Ra on one end of the roll sheet R in the width direction. The flange 206 is fixed abutting the end surface Rb on the other end of the roll sheet R in the width direction. In the present embodiment, as the roll sheet R is held in a rotatable manner by the roll holder 42, the end surface Ra on one end is positioned on the right side and the end surface Rb on the other end is positioned on the left side.

The flanges 204 and 206 are formed so that the spool shaft 202 can be inserted and removed at the center positions thereof. The flange 204 is fixed at a predetermined position which is set in advance on the spool shaft 202 regardless of the length in the width direction of the roll sheet R held on the spool shaft 202. The flange 206 is fixed after changing its position on the spool shaft 202 according to the length in the width direction of the roll sheet R held on the spool shaft 202. In the spool member 200, movement of the roll sheet R on the spool shaft 202 in the axial direction (the X direction) is restricted by the flanges 204 and 206. The roll sheet R is held at the set position RC of the roll holder 42 and rotates integrally with the spool member 200 at the set position RC. The first bearing 208 is formed on one end of the spool shaft 202 and the second bearing 210 is formed on the other end of the spool shaft 202. In the present embodiment, as the roll sheet R is held by the roll holder 42 (that is, as the roll sheet R is positioned at the set position RC), the first bearing 208 is positioned on the right side, and the second bearing 210 is positioned on the left side.

Figure 4A:
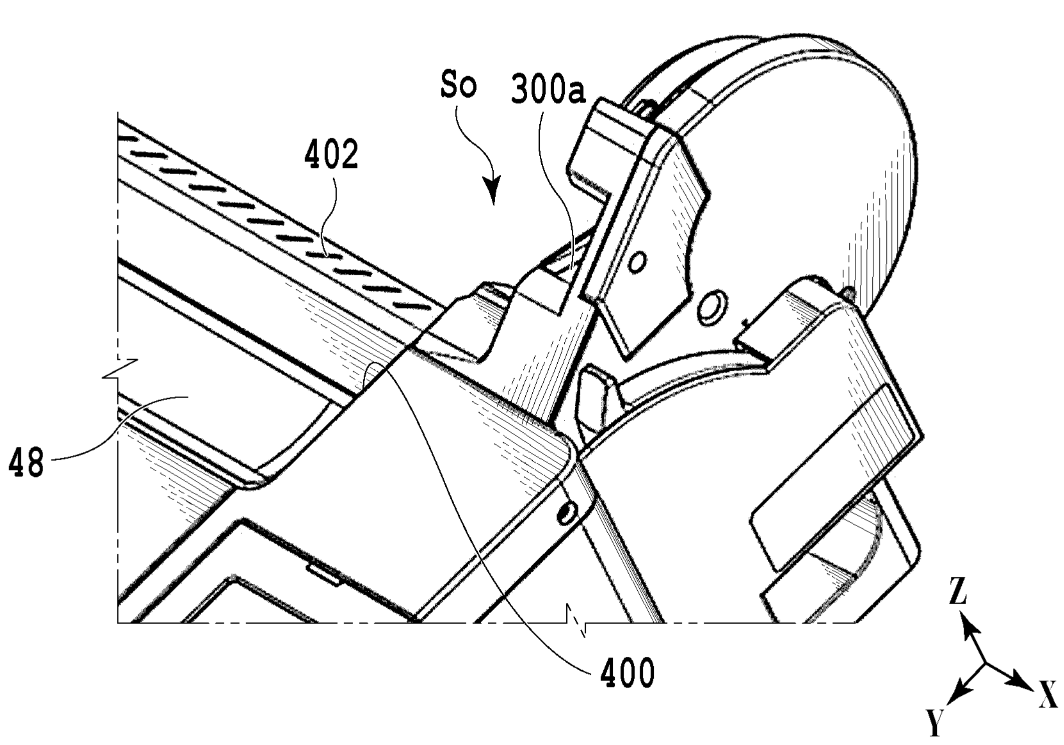
FIG. 4A and FIG. 4B are diagrams for explaining a temporary placement base.
Figure 4B:
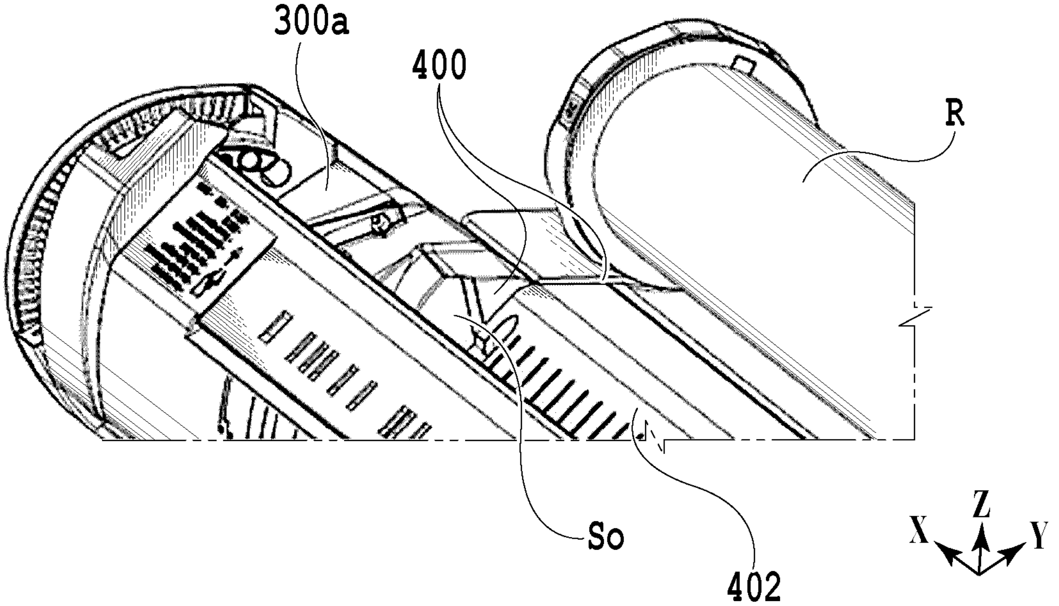

The roll holder 42 is equipped with the guide 300 (hereinafter also referred to as the "guide part") which positions the roll sheet R, which is inserted from the opening area So and to which the spool member 200 is attached, and guides the roll sheet R to the set position RC where the roll sheet R is held in a rotatable manner. On the upper surface 26*a* of the housing 26, the temporary placement base 48 is installed on the front side of the opening area So for placing the roll sheet R before insertion into the opening area So. FIG. 3A to FIG. 3C are diagrams for explaining the guide 300. Further, FIG. 3A is a perspective configuration diagram of the main body part 12, FIG. 3B is a diagram illustrating the second guide 300*b*, and FIG. 3C is a diagram illustrating the first guide 300*a*. FIG. 4A and FIG. 4B are diagrams for explaining the temporary placement base 48. Further, FIG. 4A is a partially enlarged perspective diagram of the right side of the opening area So, and FIG. 4B is a perspective diagram showing the position illustrated in FIG. 4A from a different perspective. Note that FIG. 4A shows a state in which the cover part 44 is omitted and the roll sheet R is not placed on the temporary placement base 48 for ease of understanding.

The guide 300 includes the first guide 300*a* (see FIG. 3C) installed on the right side of the apparatus and the second guide 300*b* (see FIG. 3B) installed on the left side of the apparatus. As the roll sheet R to which the spool member 200 is attached is inserted from the opening area So, the first bearing 208 is inserted into the first guide 300*a*, and the second bearing 210 is inserted into the second guide 300*b*. In the first guide 300*a*, the first bearing 208 is inserted through the opening part 302, and the inserted first bearing 208 is guided through the downward inclined surface 304 to the set position RC. Further, in the second guide 300*b*, the second bearing 210 is inserted through the opening part 306, and the inserted second bearing 210 is guided through the downward inclined surface 308 to the set position RC.

Here, the opening parts 302 and 306 are formed at height positions that allow the first bearing 208 and the second bearing 210 of the spool shaft 202 to be smoothly inserted as the roll sheet R to which the spool member 200 is already attached is inserted from the opening area So. More specifically, the positions of the opening parts 302 and 306 match on the upper side (see the one-dot chain line in FIG. 3B and FIG. 3C). On the other hand, the opening part 306 has such an opening that extends further downward by the length L1 than the opening part 302 (see the two-dot chain lines in FIG. 3B and FIG. 3C). That is, the opening part 306 has an opening that is wider than the opening part 302 by the length L1 in the height direction.

=Temporary Placement Base=

The temporary placement base 48 installed on the front side of the opening area So has a length, in the X direction, so that the longest roll sheet R that can be held in the roll holder 42 in a state where the spool member 200 is attached can be placed on the temporary placement base 48. Further, in the Z direction (the height direction), the temporary placement base 48 is positioned above the set position RC at which the roll sheet R is held in a rotatable manner in the roll holder 42. Furthermore, if cut along the YZ plane, the temporary placement base 48 has a concave shape that is recessed to have a circular arc configuration corresponding to the shape of the flanges 204 and 206 (see FIG. 4A). In other words, in the Y direction, the temporary placement base 48 has a curved shape with the same curvature as the peripheral surfaces of the flanges 204 and 206. Note that the diameters of the flanges 204 and 206 are designed to match the maximum diameter of the roll sheet R that can be used in the printing apparatus 10 or to be larger than the maximum diameter by a predetermined amount. Therefore, the present embodiment has a configuration where the roll sheet R can be placed on the temporary placement base 48, and, on the temporary placement base 48, the user can attach the spool member 200 to the placed roll sheet R. In this manner, in the present embodiment, the temporary placement base 48 functions as a base part that can support the peripheral surfaces of the roll sheet R to which the spool member 200 is not attached and the roll sheet R to which the spool member 200 is attached.

Since the temporary placement base 48 is formed to have the concave shape corresponding to the flanges 204 and 206, the roll sheet R to which the spool member 200 is attached can be placed in a stable manner on the temporary placement base 48. Further, since the temporary placement base 48 has the concave shape corresponding to the flanges 204 and 206, if the roll sheet R to which the spool member 200 is attached is viewed from the right side of the apparatus, the outer shape of the flange 204 is visible. Further, the opening area So which communicates with the internal space of the roll holder 42 is formed on the back side of the temporary placement base 48. Therefore, by pressing the roll sheet R to which the spool member 200 is already attached, which is stably placed on the temporary placement base 48, and rolling the roll sheet R to the back side, the user can insert the roll sheet R into the roll holder 42 through the opening area So.

Here, in the movement path of the roll sheet R to which the spool member 200 is already attached, i.e., from the temporary placement base 48 to the inside of the roll holder 42, the guide surface 400 (see FIG. 4A and FIG. 4B), which guides the roll sheet R placed on the temporary placement base 48 into the roll holder 42, is installed. The guide surface 400 (hereinafter also referred to as a "guide member"), which extends along the movement path, may be formed of one component or may be formed of multiple components. Furthermore, as the roll sheet R to which the spool member 200 is already attached is inserted from the temporary placement base 48 into the roll holder 42, the flange 204 is maintained to be in a state abutting on the guide surface 400. At this time, the flange 204 abuts the guide surface 400 in the outer surface 204*b* (see FIG. 2), which is opposite to the inner surface 204*a* (hereinafter also referred to as the "second side surface") that abuts the end surface Ra of the roll sheet R.

Note that, the operation part 18 is installed on the right side of the temporary placement base 48 in the X direction and on the front side of the temporary placement base 48 in the Y direction (see FIG. 3A). As described above, the roll sheet R to which the spool member 200 is attached is placed on the temporary placement base 48 with the outer surface 204*b* (hereinafter also referred to as the "first side surface") of the flange 204 abutting on the guide surface 400. At this time, one end of the spool shaft 202 is in a state protruding to the right side of the temporary placement base 48. In the present embodiment, the operation part 18 is installed on the right side of the temporary placement base 48 and on the opposite side of the opening area So in the Y direction, that is, on the front side, and thus the spool shaft 202 is never positioned directly above the operation part 18. Therefore, the user can execute an input operation to the operation part 18 without being obstructed by the spool shaft 202. Note that the operation part 18 is not limited to being installed on the right side of the temporary placement base 48 in the X direction as shown in FIG. 3A, and may be installed on the left side of the temporary placement base 48 in the X direction.

Figure 5:
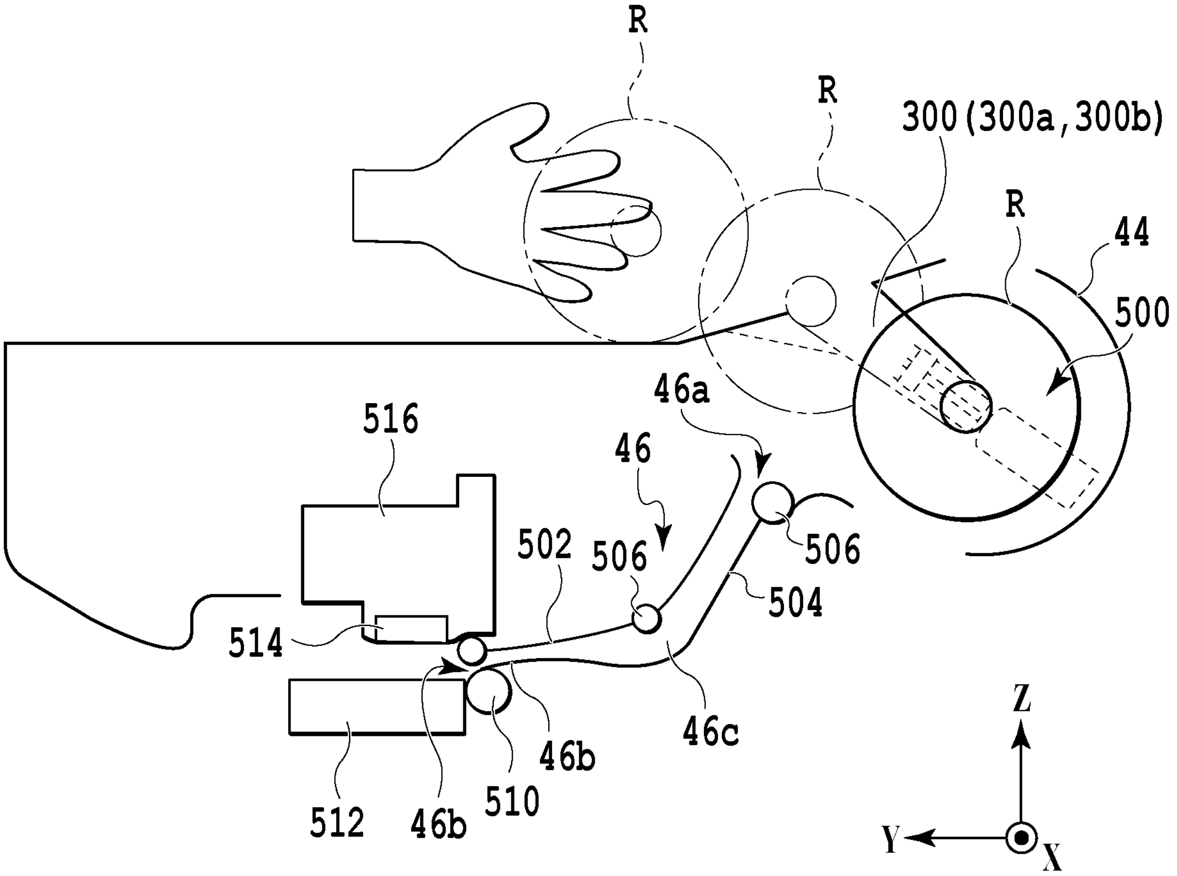
FIG. 5 is a diagram illustrating a position of the roll sheet at the time of being held by a roll holder.

Next, with reference to FIG. 5, a specific explanation is given of the insertion of the roll sheet R to which the spool member 200 is already attached, which is placed on the temporary placement base 48, into the roll holder 42. FIG. 5 is a diagram for explaining the insertion of the roll sheet R into the roll holder 42. The roll sheet R (see the two-dot chain line) to which the spool member 200 is already attached is placed on the temporary placement base 48 with the flange 204 in a state abutting on the guide surface 400. Further, if pushed to the back side by the user, the roll sheet R reaches the opening area So with the outer surface 204*b* of the flange 204 maintaining a state abutting on the guide surface 400. In the roll sheet R which has reached the opening area So (see the one-dot chain line), the first bearing 208 of the spool shaft 202 reaches the opening part 302 and the second bearing 210 reaches the opening part 306. Thereafter, the roll sheet R moves by its own weight along the rear cover 402 (see FIG. 4A and FIG. 4B) to the set position RC. At this time, positioning of the roll sheet R is performed by the guide 300, such that the first bearing 208 is guided by the first guide 300*a* and the second bearing 210 is guided by the second guide 300*b*. Positioning of the roll sheet R by the guide 300 is described hereinafter.

Note that, the roll holder 42 is equipped with the buffer member 500 which acts on the second bearing 210 of the spool member 200 attached to the roll sheet R that has moved through the guide 300. The buffer member 500 is a damper that acts on the second bearing 210 in the vicinity of the set position RC. Accordingly, the roll sheet R abuts the buffer member 500 in the vicinity of the set position RC and is moved to the set position RC by its own weight slowly due to the buffer member 500. Note that, the buffer member 500 may be installed to act on the first bearing 208 or may be installed to act on both the first bearing 208 and the second bearing 210. In a case where the buffer member 500 is made to act on the first bearing 208, for example, a cap is installed on one end side of the first bearing 208, so that the buffer member 500 acts via this cap.

=Cover Part=

In a case where the cover part 44 is opened, the internal space of the roll holder 42 and the outside are made to communicate with each other. In this state, the user performs replacement work of the roll sheet R in the roll holder 42. Further, in a case where the cover part 44 is closed, the internal space of the roll holder 42 is shielded from the outside. Therefore, the user closes the cover part 44 after replacing the roll sheet R to shield the internal space of the roll holder 42 from the outside, thereby inhibiting adhesion of dust or the like to the roll sheet R in the set position RC.

The cover part 44 pivotally moves, for example, about the rotation center that matches the rotation center of the roll sheet R at the set position RC. The cover part 44 is formed so that, in the open state, the cover part 44 does not come into contact with the roll sheet R to which the spool member 200 is already attached, which is inserted from the opening area So and moves to the set position RC. Further, the cover part 44 is formed so that, in the closed state and during the opening/closing movement, the cover part 44 does not come into contact with the roll sheet R (to which the spool member 200 is already attached) positioned at the set position RC.

=Supply Path=

The supply path 46 is configured to guide the print medium M, which is pulled out from the roll sheet R held by the roll holder 42, to the printing part 34. Further, the supply path 46 includes the upper guide 502 and the lower guide 504 which are arranged facing each other, with the clearance (the narrow passage) formed between the upper guide 502 and the lower guide 504 being the guiding path for the print medium M (see FIG. 5). The supply path 46 is configured so that the print medium M is inserted from the end 46*a* on one end and guided toward the end 46*b* on the other end where the printing part 34 is positioned. The supply path 46 extends obliquely downward from the end 46*a* on one end toward the printing part 34 side, bends at the bent part 46*c* in the middle, and extends substantially horizontally toward the printing part 34. Furthermore, in the supply path 46, the upper guide 502 and the lower guide 504 are equipped with the auxiliary rollers 506 for smooth transport of the print medium M.

<Printing Part>

At the printing position, the printing part 34 performs printing on the print medium M supplied via the supply path 46. The printing part 34 nips the print medium M supplied via the supply path 46, and is equipped with the conveyance roller 510, which conveys the print medium M toward the printing position, and the platen 512, which supports the print medium M conveyed by the conveyance roller 510 (see FIG. 5). Further, the printing part 34 is equipped with the print head 514, which can eject ink, and the carriage 516, which is mounted with the print head 514 and can reciprocally move in the X direction while the print head 514 is in a state facing the platen 512.

The print medium M pulled out from the roll sheet R, which is held by the roll holder 42, is inserted into the end 46*a* on one end of the supply path 46, passes through the supply path 46, and is nipped by the conveyance roller 510. Further, by driving of the conveyance roller 510, the print medium M pulled out from the roll sheet R is conveyed to the printing part 34. At the time of printing, the print medium M is conveyed to the printing start position by the conveyance roller 510. Further, the carriage 516 is moved in the X direction with respect to the print medium M, and in synchronization with the movement, ink is ejected from the print head 514 to execute a printing operation for printing. Then, after a conveyance operation is performed to convey the print medium M by a predetermined amount so that an area of the print medium M on which printing has not yet been performed is placed at a position facing the print head 514, the printing operation is performed again. In this way, the printing apparatus 10 performs printing on the print medium M by alternately and repeatedly performing the printing operation and the conveyance operation.

<Cutter Part and Discharge Part>

The print medium M on which printing has been performed by the printing part 34 is conveyed by the conveyance roller 510 to pass through the cutter part 36 and be discharged from the discharge part 38. The print medium M on which printing has been performed by the printing part 34 is cut by the cutter part 36 once the trailing end portion of the printed image is conveyed to the cutting position of the cutter part 36. The print medium M cut by the cutter part 36 is dropped by its own weight while being guided by the discharge part 38 and then accommodated in the accommodation part 16.

(Positioning Mechanism for Roll Sheet R)

Next, an explanation is given of a positioning mechanism for the roll sheet R in the roll holder 42. The roll sheet R is positioned in the X direction at the set position RC by the first bearing 208 of the spool shaft 202 and the regulation guide 702 (described hereinafter) and the reference surface 704 of the first guide 300*a*. Specifically, by positioning the spool shaft 202 of the spool member 200 in the X direction, positioning of the roll sheet R which is fixed to the spool shaft 202 is performed in the X direction.

Figure 6A:
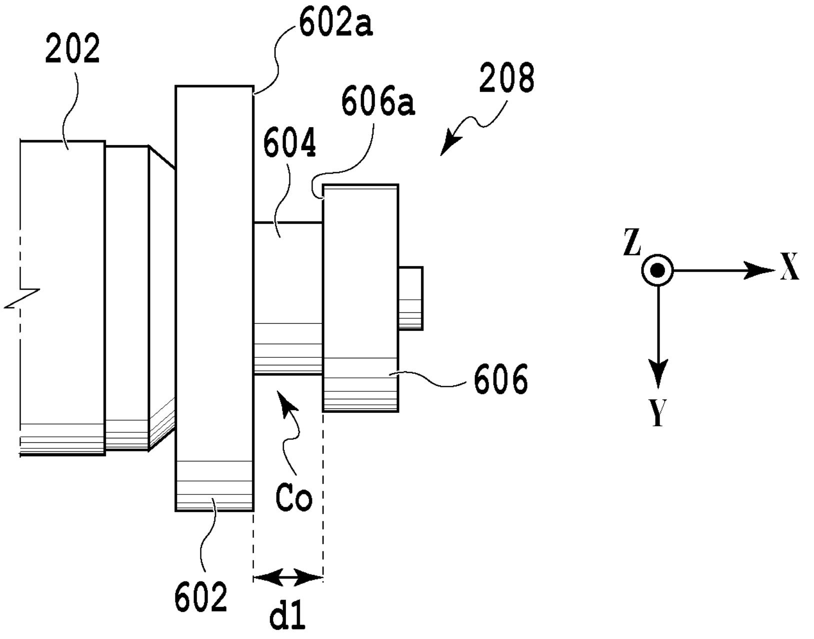
FIG. 6A and FIG. 6B are diagrams illustrating bearings installed on both ends of a spool shaft.
Figure 6B:
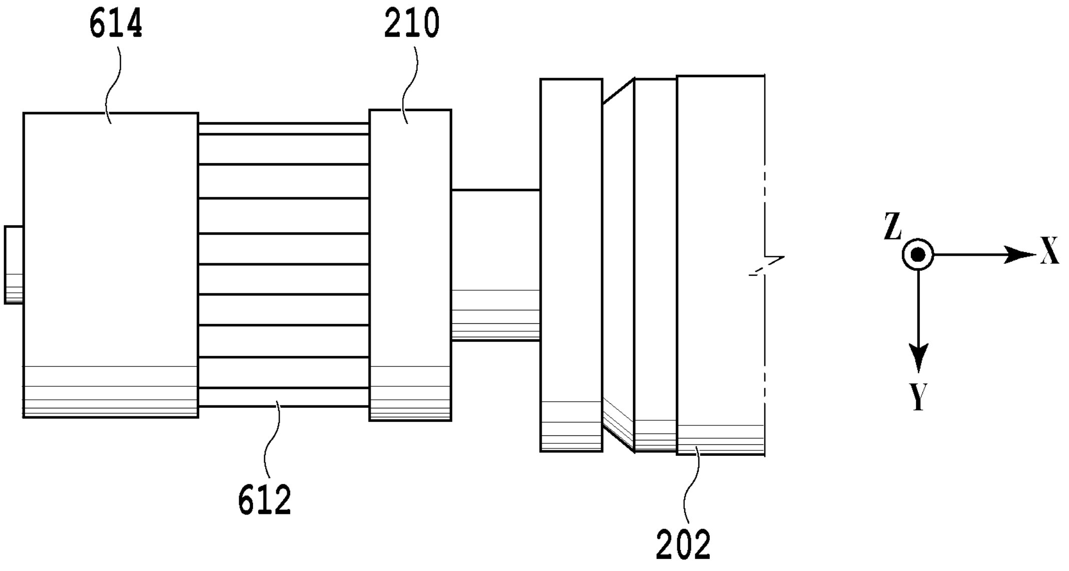

The spool shaft 202 penetrates the first bearing 208 at one end and supports the first bearing 208 in a rotatable manner in the circumferential direction (see FIG. 6A). Further, the spool shaft 202 penetrates the second bearing 210 at the other end and supports the second bearing 210 in a rotatable manner in the circumferential direction (see FIG. 6B). FIG. 6A is an enlarged view of inside the VIa frame of FIG. 2, and FIG. 6B is an enlarged view of inside the VIb frame of FIG. 2.

The first bearing 208 has a substantially cylindrical shape and is formed with three parts with diameters different from each other. Specifically, going toward one end (the right side) of the spool shaft 202, the large diameter part 602 with the largest diameter, the small diameter part 604 with the smallest diameter, and the medium diameter part 606 with a medium diameter are formed in this order. The side surfaces of the large diameter part 602 and the medium diameter part 606 are formed perpendicular to the extending direction of the spool shaft 202 (hereinafter also referred to as the "axial direction"). Although the details are described hereinafter, the side surface 602*a* of the large diameter part 602, the side surface 606*a* of the medium diameter part 606 which faces the side surface 602*a*, and the outer peripheral surface of the small diameter part 604 form the constricted part Co which is utilized for positioning the roll sheet R in the axial direction (the X direction). The side surface 602*a* is positioned closer to the center of the spool shaft 202 than the side surface 606*a* and has a larger diameter. It is preferable that the side surface 602*a* and the side surface 606*a*, which abut and slide against other constituent members during positioning, are as smooth as possible. Further, in a case where the side surface 602*a* and the side surface 606*a* are made of, for example, a resin material, use of acetal copolymer manufactured by Polyplastics Co., Ltd., Lumber (registered trademark) manufactured by Mitsui Chemicals, Inc., or other resins exhibiting high sliding properties is preferable.

On the other end side of the spool shaft 202 where the second bearing 210 is installed, the gear 612 is installed further to the other end side (the left side in the diagram)

than the second bearing 210, and, even further to the other end side than the gear 612, the cap 614 is installed. The spool shaft 202 penetrates the gear 612 and the cap 614, so as to support the gear 612 in a fixed manner and support the cap 614 in a rotatable manner. The gear 612 is connected to another gear (not illustrated in the drawings) installed in the supply part 32 and transmits torque in the direction of rewinding the roll sheet R supported by the spool shaft 202. The cap 614 is configured to abut the buffer member 500. Specifically, as the roll sheet R to which the spool member 200 is already attached moves to the set position RC via the guide 300, the cap 614 abuts the buffer member 500 in the vicinity of the set position RC.

The downward inclined surface 304 of the first guide 300*a* is equipped with the regulation guide 702 that is configured to be engaged with the first bearing 208, which is installed at one end of the spool shaft 202 inserted through the opening part 302, and guide the spool shaft 202 to the set position RC. In the present embodiment, the first bearing 208 functions as a receiving member that receives the regulation guide 702 during engagement. Further, the first guide 300*a* is equipped with the reference surface 704 which abuts the first bearing 208 together with the regulation guide 702 at the set position RC, so as to determine the position of the spool shaft 202 in the X direction (see FIG. 7).

Figure 7:
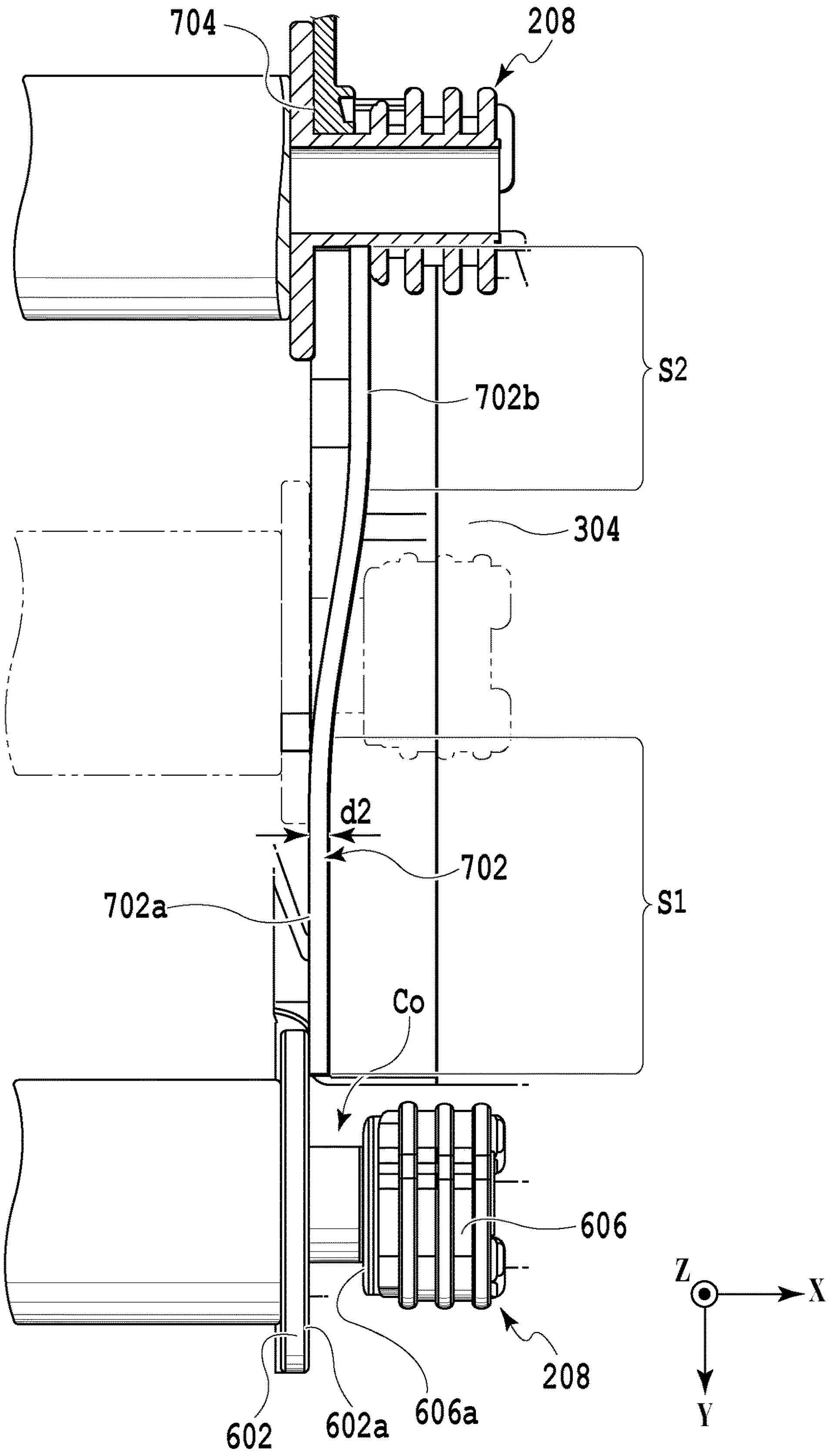
FIG. 7 is a diagram illustrating the positional relationship between a regulation guide in a first guide and a first bearing.

FIG. 7 is a cross-sectional view diagram taken along the VII-VII line of FIG. 1 and is a diagram for explaining the regulation guide 702 and the reference surface 704. In FIG. 7, the lower side of the diagram is the opening part 302 side, and the set position RC is positioned on the upper side of the diagram. The regulation guide 702 extends from the opening part 302 (or its vicinity) across to the set position RC, and is able to engage with the first bearing 208 inserted from the opening part 302. A portion of the first bearing 208 that engages with the regulation guide 702 is the constricted part Co of the first bearing 208 between the large diameter part 602 and the medium diameter part 606.

The regulation guide 702 has the predetermined thickness d2 and has a rib shape erected on the downward inclined surface 304. The thickness d2 of the regulation guide 702 (the interval between the side surface 702*a* and the side surface 702*b* described hereinafter) is shorter than the interval d1 between the side surface 602*a* and the side surface 606*a* of the first bearing 208 (see FIG. 6A). Note that the thickness of the regulation guide 702 may be uniform, or the thickness may be different in some areas. Further, the regulation guide 702 is formed so that the position in the X direction differs between the opening part 302 side and the set position RC side. Specifically, the regulation guide 702 extends from the opening part 302 side in a direction perpendicular to the X direction, gradually shifts to one side (the right side) in the X direction in the intermediate area, and, from a predetermined position, has a shape extending in the direction perpendicular to the X direction.

More specifically, in the area S1 on the opening part 302 side, the side surface 702*a* on the other side (the left side) of the regulation guide 702 in the X direction is separated from the guide surface 400 by a predetermined distance in the X direction. Here, it is assumed that the distance in the X direction between the outer surface 204*b* of the flange 204 fixed to the spool shaft 202 and the side surface 602*a* of the first bearing 208 is l1 (see FIG. 2). Further, it is assumed that the distance in the X direction between the outer surface 204*b* and the side surface 606*a* of the first bearing 208 is l2 (>l1) (see FIG. 2). Furthermore, it is assumed that the thickness of the regulation guide 702 is d2. In this instance, the predetermined distance is equal to or greater than the distance l1 and less than the value obtained by subtracting the thickness d2 from the distance l2 (l2−d2). Accordingly, in a case where the roll sheet R is placed on the temporary placement base 48 with the outer surface 204*b* of the flange 204 abutting the guide surface 400, the side surface 702*a* in the area S1 is not positioned further to the other side in the X direction (the left side) than the side surface 602*a*. Further, in the area S1, the side surface 702*b* on one side of the regulation guide 702 in the X direction is not positioned further to one side in the X direction (the right side) than the side surface 606*a*.

Further, in the area S2 on the set position RC side, the side surface 702*b* is separated from the side surface 702*a* of the area S1 by the interval d1 (the interval between the side surface 602*a* and the side surface 606*a*) in the X direction.

In the set position RC, the reference surface 704 performs positioning of the spool shaft 202 in the X direction via the first bearing 208 together with an end of the regulation guide 702. The reference surface 704 is arranged at a position that matches the side surface 702*a* in the area S1 in the X direction. That is, in the set position RC, the reference surface 704 is arranged at a position separated to the other side in the X direction (the left side) from the side surface 702*b* of the regulation guide 702 by a distance that matches the interval d1 in the X direction. Accordingly, in the set position RC, the constricted part Co of the first bearing 208 is engaged with the reference surface 704 and the regulation guide 702 on the area S2 side.

(Roll Sheet Replacement Work)

Figure 8B:
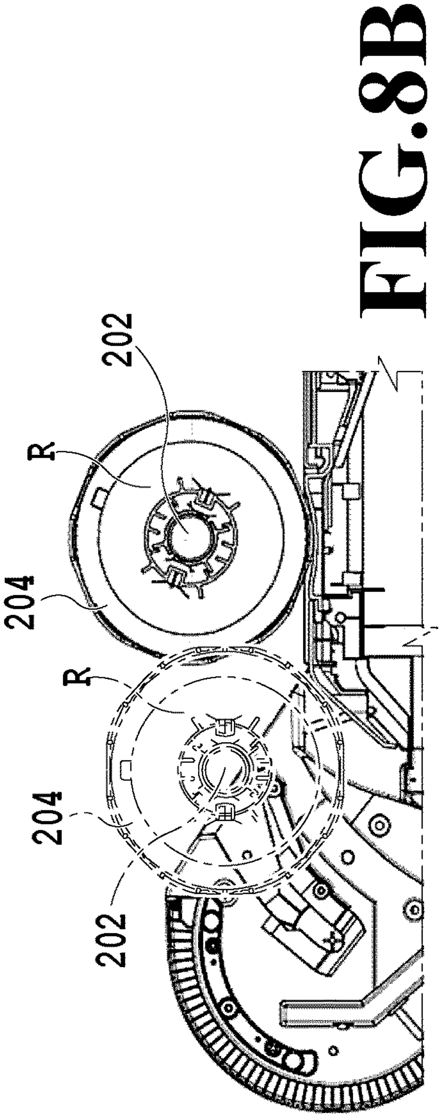
FIG. 8A to FIG. 8D are diagrams illustrating the positional relationship between the spool member and the first guide at the time of insertion of the roll sheet.
Figure 8C:
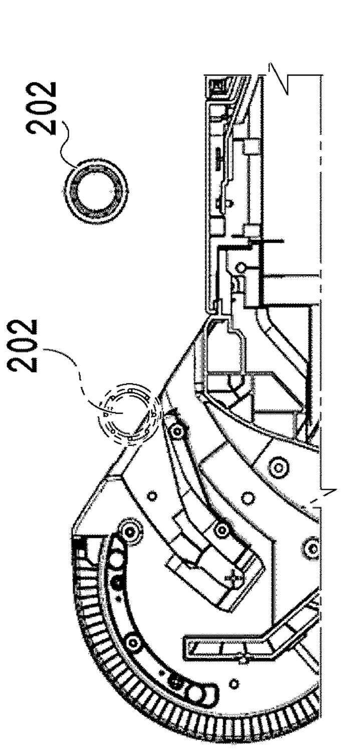
Figure 8D:
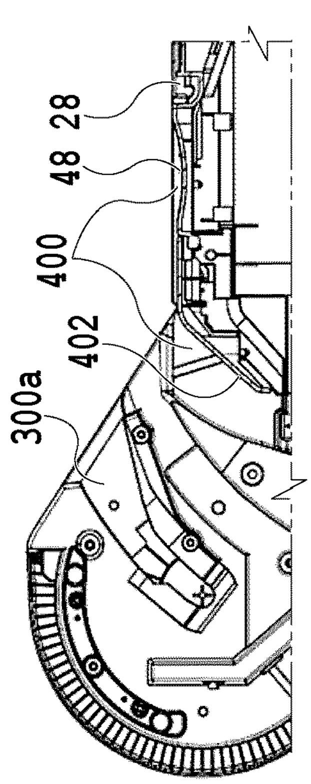
Figure 8A:
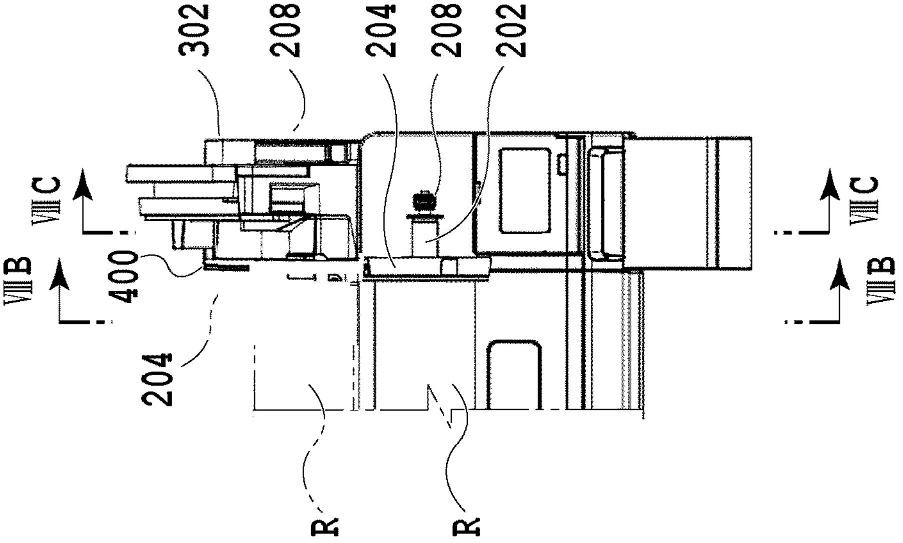

With the above configuration, in the printing apparatus 10, the roll sheet R is replaced at a predetermined timing such as the timing of the roll sheet R becoming equal to or less than a predetermined amount. Since the work of removing the roll sheet R held by the roll holder 42 is the same as that of a publicly-known technique, in the following explanation, FIG. 8A to FIG. 8D, which explain the work to have the roll sheet R held by the roll holder 42, are diagrams illustrating the positions of the roll sheet R, the first bearing 208, etc., at the time of insertion from the temporary placement base 48 into the roll holder 42. FIG. 8A is a partially enlarged diagram of one side of the main body part 12 in the X direction, and FIG. 8B is a cross-sectional diagram taken along the line VIIIB-VIIIB of FIG. 8A. FIG. 8C is a cross-sectional diagram taken along the line VIIIC-VIIIC of FIG. 8A, and FIG. 8D is a diagram illustrating the state in which the roll sheet R is removed from FIG. 8B and FIG. 8C.

In the printing apparatus 10, to have the roll sheet R held in the roll holder 42, the user first places the roll sheet R on the temporary placement base 48. At this time, since the temporary placement base 48 is formed in an arc shape extending in the X direction, the placed roll sheet R is unlikely to roll. Next, the user attaches the spool member 200 to the placed roll sheet R. Specifically, the spool shaft 202 is inserted into the core of the roll sheet R, the flange 204 is made to abut the end surface Ra of the roll sheet R and fixed, and the flange 206 is made to abut the end surface Rb of the roll sheet R and fixed. Then, the outer surface 204*b* of the flange 204 is made to abut the guide surface 400 (see the solid line roll sheet R in FIG. 8A). The guide surface 400 extends along the moving direction of the flange 204 as the roll sheet R is inserted from the opening area So (see FIG. 8D).

Next, while maintaining the guide surface 400 (see FIG. 8D) and the outer surface 204*b* of the flange 204 in a state of abutting, the user presses the roll sheet R to which the spool member 200 is already attached from the front side to the back side. Accordingly, the roll sheet R rolls to be inserted into the opening area So of the roll holder 42 positioned on the back side of the temporary placement base 48. During the insertion, the first bearing 208 is inserted from the opening part 302 of the first guide 300*a* (see the two-dot chain line roll sheet R in FIG. 8A to FIG. 8C). Further, during the insertion, the second bearing 210 is inserted from the opening part 306 of the second guide 300*b*. Then, as the roll sheet R moves along the rear cover 402 and enters into the roll holder 42, the constricted part Co of the first bearing 208 engages with the regulation guide 702 of the first guide 300*a*. Until this time, the outer surface 204*b* of the flange 204 and the guide surface 400 maintain a state of abutting. In other words, the guide surface 400 extends from the temporary placement base 48 to at least a position where the constricted part Co of the first bearing 208 engages with the regulation guide 702.

Here, the guide surface 400 and the side surface 702*a* in the area S1 on the opening part 302 side of the regulation guide 702 are separated by a predetermined distance. Note that the predetermined distance satisfies "distance $l1 \leq (\text{predetermined distance}) < \text{distance } l2 - \text{interval } d2$". Therefore, if the roll sheet R is placed on the temporary placement base 48 so that the guide surface 400 and the outer surface 204*b* of the flange 204 abut, in the X direction, the end of the regulation guide 702 on the opening part 302 side is positioned in the constricted part Co of the first bearing 208. As a result, as the roll sheet R is pressed and inserted into the opening area So while the guide surface 400 and the outer surface 204*b* are maintained in a state of abutting, the regulation guide 702 engages with the constricted part Co of the first bearing 208. During engagement of the constricted part Co on the opening part 302 side of the regulation guide 702, for example, the side surface 602*a* abuts the side surface 702*a* of the regulation guide 702, so that movement of the spool shaft 202 is regulated on one side (the right side) in the X direction. Therefore, on the opening part 302 side, the position of the spool shaft 202 is roughly regulated in the X direction by the engagement between the constricted part Co and the regulation guide 702, and the position in the axial direction (the X direction) of the spool shaft 202 is regulated so as to be movable relative to the set position RC.

Thereafter, as the roll sheet R moves by its own weight along the rear cover 402 toward the set position RC while being guided by the guide 300, the side surface 606*a* abuts the side surface 702*b*, and the spool shaft 202 moves to one side in the X direction. At this time, the side surface 602*a* separates from the side surface 702*a*. That is, before reaching the set position RC, the side surface 606*a* abuts the side surface 702*b*, and the movement of the spool shaft 202 to the other side in the X direction is regulated. Thus, in the present embodiment, the regulation guide 702 functions as a regulation member that guides the roll sheet R to which the spool member 200 is already attached to the set position RC and regulates movement in the X direction.

Then, as the roll sheet R reaches the vicinity of the set position RC, the cap 614 of the second bearing 210 and the buffer member 500 abut, and for the remainder to the set position RC, the buffering action of the buffer member 500 causes slow movement to the set position RC. Thereafter, as the roll sheet R reaches the set position RC, while abutting of the side surface 606*a* on the side surface 702*b* is being maintained, the side surface 602*a* abuts the reference surface 704 which is separated from the side surface 702*b* by the interval d1 in the X direction. As a result, movement of the spool shaft 202 to one side in the X direction and to the other side in the X direction is regulated. That is, the position of the spool shaft 202 in the X direction is determined. Note that, at the set position RC, the outer peripheral surface of the small diameter part 604 of the first bearing 208 and the constituent members (not illustrated in the drawings) of the roll holder 42 abut and perform positioning in the Y and Z directions.

Figure 9:
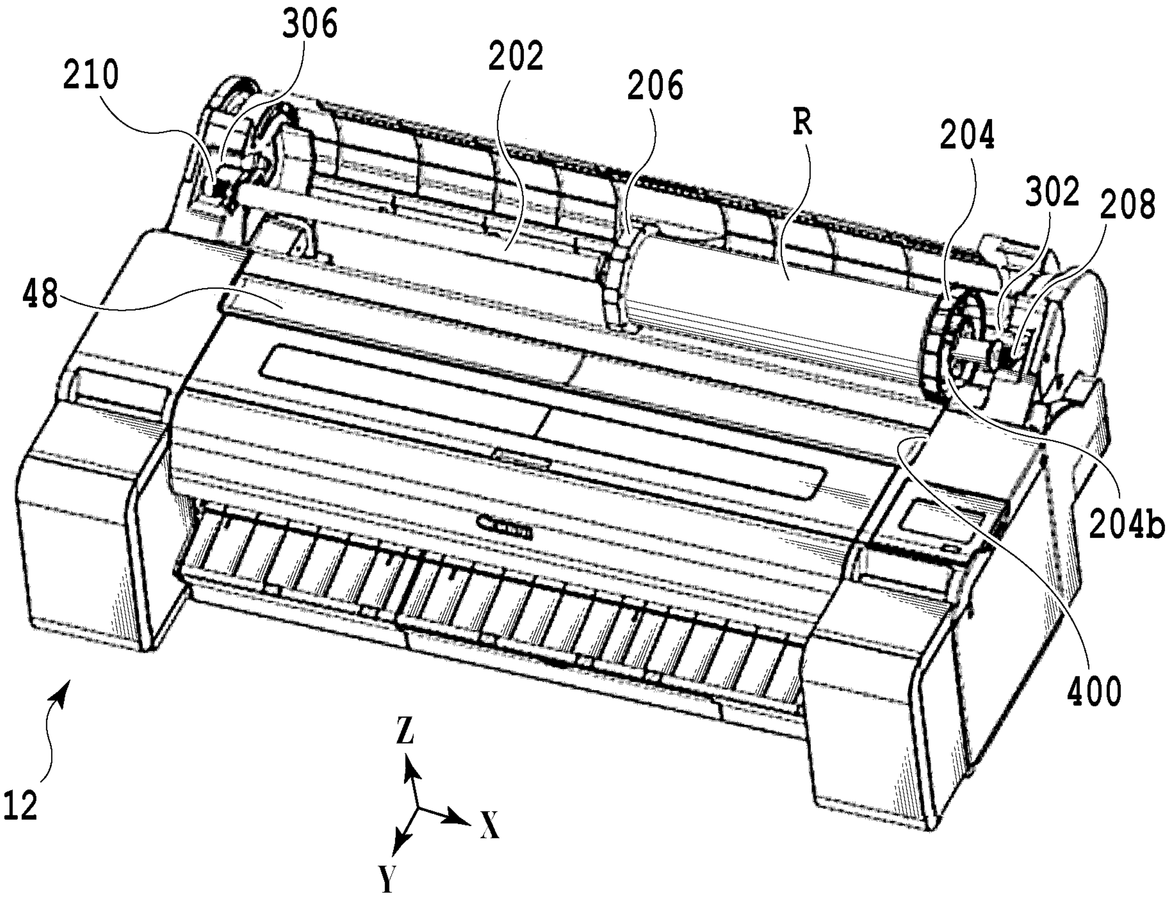
FIG. 9 is a diagram illustrating a state in which a roll sheet that is short in the width direction is inserted into the roll holder.

Incidentally, in the printing apparatus 10, it is possible to perform printing using the roll sheet Rs which is short in the width direction (see FIG. 9). FIG. 9 is a perspective view diagram of the main body part 12 at the time of insertion of the roll sheet Rs which is short in the width direction into the opening area So. If the roll sheet Rs, which is short in the width direction, is placed on the temporary placement base 48 in a state where the outer surface 204*b* of the flange 204 abuts the guide surface 400, the flange 206 is positioned close to the center of the temporary placement base 48.

Then, the roll sheet Rs placed on the temporary placement base 48 is pressed, and, while maintaining the outer surface 204*b* of the flange 204 in a state of abutting the guide surface 400, the roll sheet Rs is inserted into the opening area So. At this time, on the spool shaft 202, the roll sheet Rs is positioned off-centered to one side (the right side) in the X direction. Therefore, the position of the other side (the left side) of the spool shaft 202 in the X direction is prone to vary in the up-down direction and the front-back direction. Therefore, the position of the second bearing 210 installed on the other side of the spool shaft 202 in the X direction may also vary in the up-down direction and the front-back direction.

In the present embodiment, as described above, the opening part 306 of the second guide 300*b* into which the second bearing 210 is inserted is formed to open downward wider than the opening part 302 of the first guide 300*a* into which the first bearing 208 is inserted. Therefore, even if the position of the second bearing 210 varies, the second bearing 210 can be easily inserted into the opening part 306.

As explained above, in the present embodiment, on the upper surface 26*a* of the housing 26 in the main body part 12, on the back side of the access cover 28 for the printing part 34 and the front side of the roll holder 42, the temporary placement base 48 on which the roll sheet R can be placed is installed. The temporary placement base 48 is configured so that the spool member 200 can be attached to the roll sheet R, and the guide surface 400 extending into the roll holder 42 can be installed on one side of the temporary placement base 48 in the X direction. The guide surface 400 is formed at least to a position where, as the roll sheet R is inserted into the roll holder 42 in a state abutting the outer surface 204*b* of the flange 204, the first bearing 208 and the regulation guide 702 can be engaged.

Accordingly, with the printing apparatus 10, at the temporary placement base 48, it is possible to execute the work of attaching the spool member 200 to the roll sheet R, and the replacement work of the roll sheet R can be performed efficiently. Further, as the roll sheet R is inserted from the temporary placement base 48 into the roll holder 42, by maintaining the outer surface 204*b* of the flange 204 in a state of abutting the guide surface 400, the first bearing 208 can be engaged with the regulation guide 702 which performs positioning of the spool shaft 202 in the X direction. As a result, the roll sheet R to which the spool member 200 is attached at the temporary placement base 48 can be held while being positioned for the roll holder 42. Therefore, the user can have the roll holder 42 hold the roll sheet R, to which the spool member 200 is attached at the temporary placement base 48, in a properly positioned state, simply by inserting the roll sheet R into the opening area So while maintaining the outer surface 204*b* and the guide surface 400 in a state of abutting.

Other Embodiments

Note that the above-described embodiments may be modified as shown in the following (1) through (4).

Figure 10A:
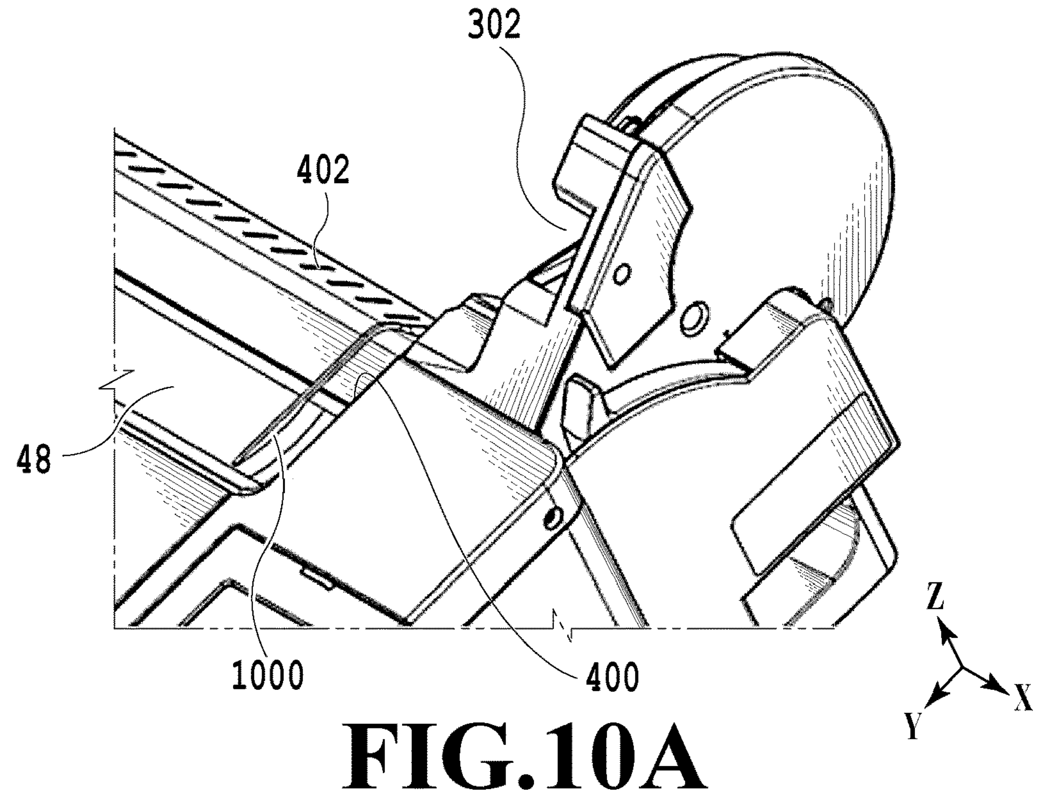
FIG. 10A and FIG. 10B are diagrams for explaining a sub-guide surface.
Figure 10B:
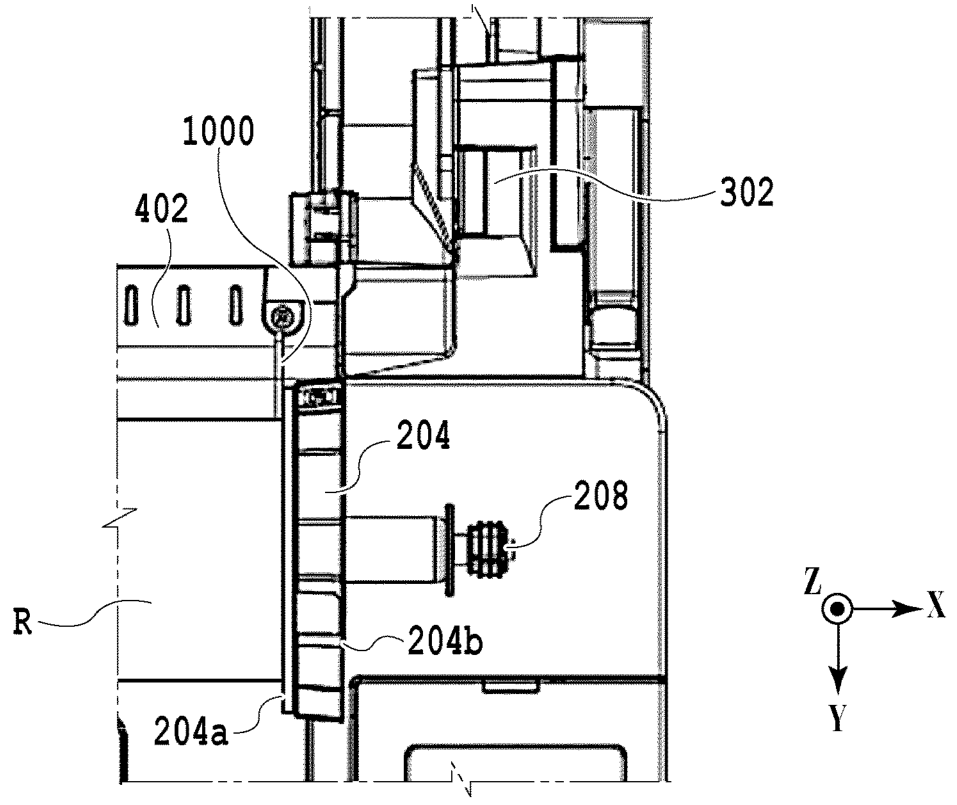

(1) In the above-described embodiment, the guide surface 400 is formed as a guide member that guides the roll sheet R, which is placed on the temporary placement base 48 and to which the spool member 200 is already attached, to a position where the first bearing 208 and the regulation guide 702 engage. However, such a guide member is not limited to the guide surface 400. That is, the sub-guide surface 1000 may be further installed as the guide member (see FIG. 10A and FIG. 10B). FIG. 10A and FIG. 10B are diagrams illustrating one form of the sub-guide surface 1000. Further, FIG. 10A is a perspective view diagram and FIG. 10B is a plan view diagram of a state in which the roll sheet R is placed on the temporary placement base 48.

The sub-guide surface 1000 is formed parallel to the guide surface 400 on the other side (the left side) of the guide surface 400 in the X direction and at a position separated from the guide surface 400 by a distance corresponding to the width (the length in the X direction) of the flange 204. The height of the sub-guide surface 1000 is set to a value smaller than the difference between the radius of the flange 204 and the radius of the maximum diameter of the roll sheet R. As a result, on the temporary placement base 48, at the time the outer surface 204*b* of the flange 204 is made to abut the guide surface 400, the sub-guide surface 1000 is made to abut the inner surface 204*a* of the flange 204 without coming into contact with the roll sheet R. Further, as the roll sheet R is inserted from the temporary placement base 48 into the opening area So, the outer surface 204*b* of the flange 204 can be more reliably maintained in a state of abutting the guide surface 400.

The length of the sub-guide surface 1000 extending from the temporary placement base 48 to the rear cover 402 in the extending direction is, for example, set elongating from the temporary placement base 48 to at least the position where the constricted part Co of the first bearing 208 engages with the regulation guide 702. The sub-guide surface 1000 may be formed with one component, or may be formed with multiple components. The sub-guide surface 1000 is not limited to such a form configured to protrude upward as illustrated in FIG. 10A and FIG. 10B. From the temporary placement base 48 to the rear cover 402, the sub-guide surface 1000 may be formed with a length corresponding to the width of the flange 204 in a shape which is recessed downward so as to oppose the guide surface 400. In this case, the diameters of the flanges 204 and 206 are designed to be larger than the maximum diameter of the roll sheet R that can be used in the printing apparatus 10 by a predetermined amount. Further, the length of the sub-guide surface 1000 in the height direction is designed to be smaller than the difference between the radius of the flanges 204 and 206 and the radius of the maximum diameter of the roll sheet R.

(2) In the above-described embodiment, although the first bearing 208 and the regulation guide 702, which serve as a configuration for positioning the roll sheet R, are installed on the right side of the apparatus, there is not a limitation as such. That is, a configuration for positioning the roll sheet R which is equivalent to the first bearing 208 and the regulation guide 702 may be installed on the left side of the apparatus.

(3) In the above embodiment, the spool member 200 includes the spool shaft 202, which penetrates through the core of the roll sheet R, and the flanges 204 and 206, which support the end surfaces of the roll sheet R and into which the spool shaft 202 can be inserted. However, the configuration of the spool member 200 is not limited as such. The spool member 200 may be configured of, for example, two flanges with a protrusion formed at the center position of each inner surface and outer surface. In this case, the bearings (the first bearing 208 and the second bearing 210) are formed at the tips of the protrusions formed on the outer surfaces of the flanges. Further, the protrusions formed on the inner surfaces of the flanges are inserted through the roll core of the roll sheet R, and the protrusions formed on the outer surfaces of the flanges are inserted into the guide 300.

(4) The above-described embodiment and the various forms shown in (1) through (3) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-172189, filed Oct. 27, 2022, which is hereby incorporated by reference herein in its entirety.

What is claimed is:

1. A printing apparatus comprising:

a shaft member attached to a roll sheet formed by winding a sheet;

a supply unit configured to support, in a rotatable manner, the roll sheet to which the shaft member is attached and supply a sheet unwound from the roll sheet to which the shaft member is attached;

a printing unit configured to perform printing on the sheet supplied by the supply unit;

a base part arranged above the supply unit and configured to support the roll sheet;

a first guide configured to guide a first end of the shaft member to the supply unit; and a second guide configured to guide a second end of the shaft member to the supply unit, wherein an opening part into which the second end of the shaft member is inserted in the second guide is open more widely in a downward direction than an opening part into which the first end of the shaft member is inserted in the first guide, and wherein, by moving the roll sheet to which the shaft member is attached from the base part, the first end of the shaft member is inserted into the first guide and the second end of the shaft member is inserted into the second guide.

2. The printing apparatus according to claim 1, wherein the shaft member is equipped with a flange that supports the first end of the roll sheet, and wherein the base part supports the roll sheet to which the shaft member is attached at the flange.

3. The printing apparatus according to claim 2, further comprising:

a guide member configured to guide the roll sheet to which the shaft member is attached moving from the base part to the supply unit while maintaining a state of abutting the flange which supports the first end of the roll sheet.

4. The printing apparatus according to claim 3,
wherein the first guide engages with a receiving member installed at the first end of the shaft member, and is also equipped with a regulation member which regulates movement of the roll sheet in its extending direction.

5. The printing apparatus according to claim 4,
wherein the guide member extends from the base part to a position where the receiving member engages with the regulation member.

6. The printing apparatus according to claim 5,
wherein the guide member abuts a first side surface of the flange which does not abut an end of the roll sheet.

7. The printing apparatus according to claim 6,
wherein the guide member further abuts a second side surface of the flange which abuts an end of the roll sheet.

8. The printing apparatus according to claim 6,
wherein the guide member is formed with a protrusion from a surface abutting a peripheral surface of the flange at the base part.

9. The printing apparatus according to claim 7,
wherein, at the base part, a portion that abuts a peripheral surface of the flange is recessed to form the guide member.

10. The printing apparatus according to claim 1, further comprising:
an access cover for allowing access to the printing unit.

11. The printing apparatus according to claim 10,
wherein the base part is positioned between the access cover and the supply unit in a depth direction and above the supply unit in a height direction.

12. The printing apparatus according to claim 11, further comprising:
an operation unit configured to allow execution of an input operation,
wherein the operation unit is in a position different from the base part in a width direction which intersects with the depth direction and the height direction, and is arranged closer to the access cover than the base part in the depth direction.

13. The printing apparatus according to claim 1,
wherein the shaft member passes through a core of the roll sheet.

14. The printing apparatus according to claim 1,
wherein the supply unit is equipped with an opening area into which the roll sheet to which the shaft member is attached can be inserted.

15. A printing apparatus comprising:
a shaft member attached to a roll sheet formed by winding a sheet and equipped with a flange that supports an end of the roll sheet;
a supply unit configured to support, in a rotatable manner, the roll sheet to which the shaft member is attached and supply a sheet unwound from the roll sheet to which the shaft member is attached;
a printing unit configured to perform printing on the sheet supplied by the supply unit;
a base part arranged above the supply unit and configured to support the roll sheet to which the shaft member is attached at the flange; and
a guide part configured to guide the roll sheet to which the shaft member is attached to the supply unit via the shaft member,
wherein the shaft member is inserted into the guide part by moving the roll sheet to which the shaft member is attached from the base part, and
wherein the base part is curved with the same curvature as a peripheral surface of the flange.

* * * * *